May 27, 1969

I. A. CASTIELLO ET AL 3,446,663

SEPARATING DEVICE

Filed April 22, 1965

INVENTORS:
Ignacio Aranguren Castiello,
Jay E. Olnick,
Octavio Vásquez Sierra.

by

ATTORNEYS.

United States Patent Office 3,446,663
Patented May 27, 1969

3,446,663
SEPARATING DEVICE
Ignacio Araguren Castiello, Guadalajara, Jalisco, and Octavia Vasquez Sierra and Jay E. Olnick, Mexico City, Mexico, assignors to Union Starch & Refining Co., Inc., Columbus, Ind., a corporation of Indiana, and Aranguren y Cia., S.A., Guadalajara, Jalisco, Mexico, a corporation of Mexico
Filed Apr. 22, 1965, Ser. No. 449,972
Int. Cl. C13l 1/00; B07b 1/20
U.S. Cl. 127—25                              4 Claims

ABSTRACT OF THE DISCLOSURE

A centrifugal separator for fiber-starch-water slurries is provided wherein the slurry is fed into the central portion of a rotary member, passes tangentially outwardly through rotating vanes and impinges against a stationary upwardly diverging frustoconical screen. The water and fine material, such as starch, passes through the screen while the larger material, such as fiber, passes up along the diverging inner surface of the screen for separate collection.

---

This invention relates to a machine for separating finely divided material in a liquid slurry from the fibrous, flaky material, more particularly it relates to a device for separating fibers from a fiber-starch-water slurry.

Among the objects of the invention is to provide an improved device for separating starch and fibers from a fiber-starch-water slurry.

Among other objects of the invention is to provide a highly efficient, fiber washing device which operates to continuously separate a fibrous component and an aqueous starch component from a fiber-starch-water slurry.

The objects of the invention are attained by providing a rotating means to throw a continuous film of slurry against a screen having an upwardly diverging frustoconical shape, the cone angle of the screen, the velocity of the slurry, etc. being such that the slurry tends to climb the screen while the water and finely divided starch pass through the screen and the fibers continue to travel upward. Means are provided to convey the fibers over the top of the screen.

The angle one side of the screen makes with the vertical axis of said screen is from 3 to 20° depending somewhat on the material to be separated, the proportion of fibrous to finely divided particles in the slurry, the rate of feed and velocity of the slurry when it hits the screen, etc.

The device will be described which is especially useful in the recovery of fibrous products from starch, but it will be understood that the device is useful for any fiber separating or washing operation including the preparation of fibers for the paper industry.

Figure 1:
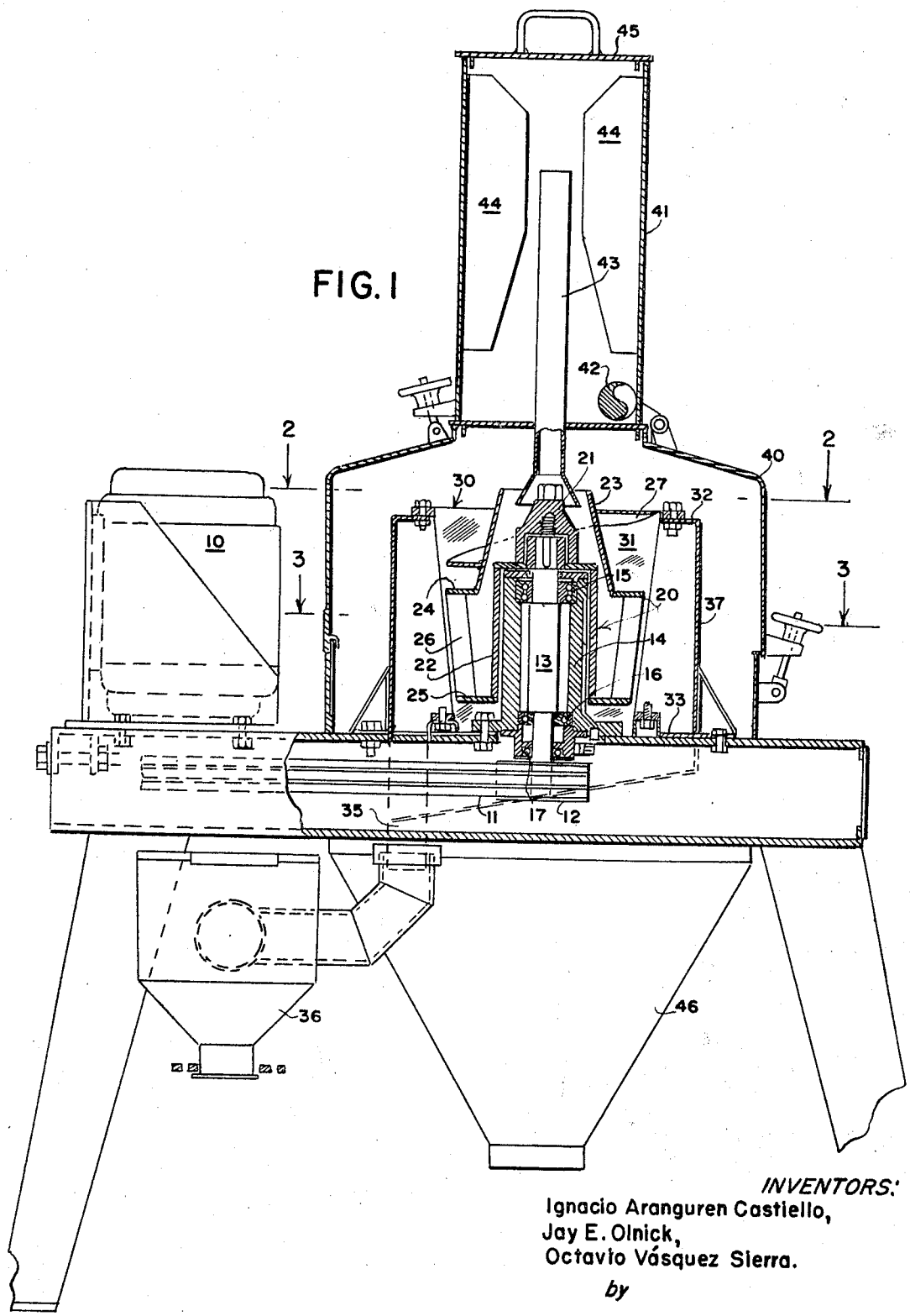
FIG. 1 is a side view partly in vertical section of the separating device of the invention.
Figure 2:
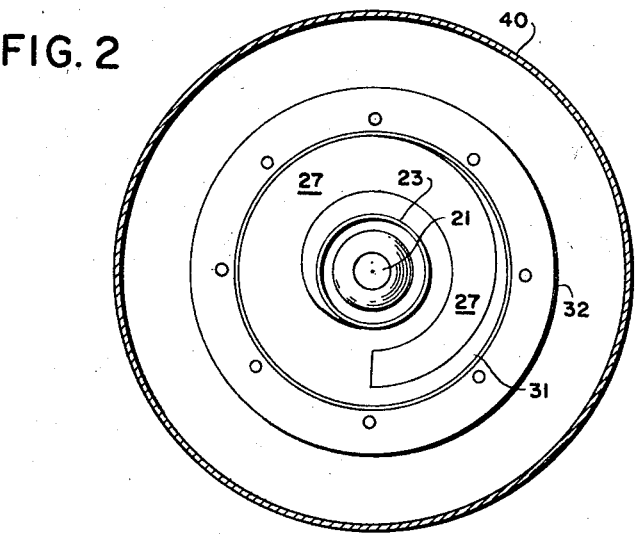
FIG. 2 is a horizontal cross sectional view taken on line 2—2 of FIG. 1.
Figure 3:
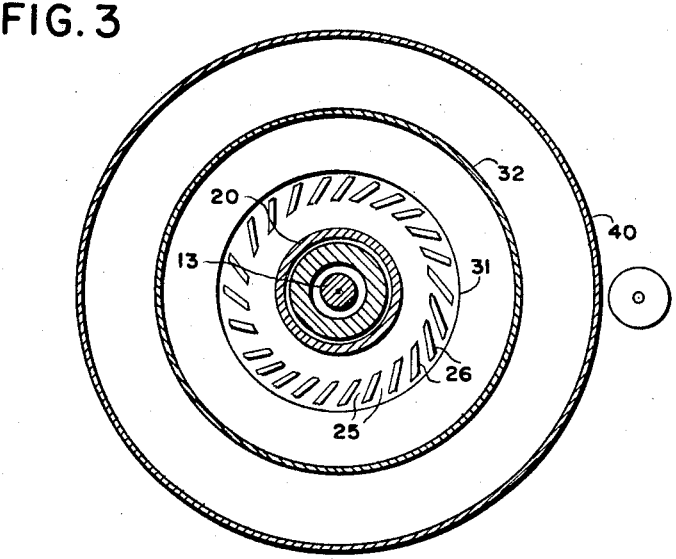
FIG. 3 is a horizontal cross sectional view taken on line 3—3 of FIG. 1.

The rotor 20 of the device is driven by motor 10 through belt drive 11, pulley 12 and shaft 13. Shaft 13 is mounted for rotation within tube 14 by suitable bearings 15 and 16. A moisture-grease seal 17 is also shown.

The rotor 20 comprises the upper hub and guide portion 21, the inner tubular wall portion 22, the upper, upwardly converging, frustoconical tube 23, upper wall 24 and bottom wall 25 formed as flanges on tube 23 and wall 22, and a helical vane conveyor 27 mounted above wall 24 outside tube 23 and serving to transport the fibers from near the top of the screen 31 to the region above the top of the latter. An array of circumferentially spaced vanes 26 extend vertically between walls 24 and 25.

The filter means 30 comprises the tubular screen 31 which has the shape of an upwardly diverging frustoconical tube extending upwards well beyond vanes 26. The screen 31 for example may be formed from wedge wire slit screen material having openings of about 50 microns in diameter. Such a screen will effect removal of particles as small as 25 microns in the device of the invention. The angle of divergence of the screen is similar to or follows the angle made by the outside edges of vanes 26. The screen 31 is held between the flanges 32 and 33 of a tubular casing 37 which encloses the screen. Liquid passing through screen 31 is collected in pipe 35, which leads from an opening wall of casing 37, and conveyed to collector 36. Fibers passing over the top of filter 30 are collected in funnel 46.

The filter 30 is surrounded by casing 40 on top of which is positioned the feed tank 41. Liquid to be filtered to remove fiber is fed to the tank 41 through the pipe 42 at the lower end thereof and leaves the tank 41 through the pipe 43 after passing upwardly to overflow into pipe 43. The tank 41 thus provides a trap for the separation of heavy particles which remain in the lower part of the tank. A lid 45 is provided for tank 41.

In operation, a fiber slurry which may be a starch-fiber-water slurry or merely a dirty fiber slurry is fed to tank 41 through inlet pipe 42. The rotor 20 is started and rotated at about 1000 to 2000 r.p.m. As the slurry fed to tank 41 reaches the top of pipe 43 it is passed over hub 21 of rotor 20 and down through the central aperture where wall 24 joins tube 23. Walls 22, 24 and 25 are impervious and centrifugal force impels the liquid outwardly and the vanes 26 expel the liquid in a tangential direction. When the liquid strikes the stationary screen in a tangential direction, its path of least resistance is then slightly upwardly rather than downwardly due to the frustoconical shape of the screen. As the liquid passes upwardly, the liquid and finer particles thereof pass through the screen and are collected through tube 35 in tank 36 whereas the larger particles, i.e. fibers, continue to move upwardly until the helical vane 27 which closely follows the contour of and extends above screen 31 contacts said fibers and more positively moves them upwardly and over the top of the filter 30.

This device takes advantage of the principle of filtration that the efficiency of a filtration surface can be increased by passing more material to be filtered over its surface. The capacity of the filtration surface of the present invention for filtering starch slurries as compared to shakers is 37:1. That is, the present apparatus with a filtration surface of 2700 sq. cm. takes the place of 5 shakers of 2 sq. meters each, or a total of 100,000 sq. cm. of filter surface. The space required for the installation of the present invention is obviously much less than that required for 5 shakers.

The angle of divergence from the vertical of the sides of the filter screen and the outer edges of the vanes 26 is a critical value and as stated above should be between 3° and 20°. If the angle is over 20°, the material moves upwardly too fast. The rate of feed of the liquid to tank 41 and thus through pipe 43 is regulated so that the level of liquid in the tank 41 does not rise appreciably above the top of pipe 43.

With the device no storage tanks are necessary, starch slurry or similar material to be filtered can be supplied directly from the milling or germ separating device, the liquid from collector 36 may be fed back into the system if it contains minor amounts of starch or to a dewatering system if it contains major amounts of starch. Fiber from the collector 46 which fiber ordinarily has a moisture content of 65–95% may be fed directly to a conveyor or to a squeezing means to remove excess moisture.

The features and principles underlying the invention described above in connection with specific exemplifications will suggest to those skilled in the art many other modifications thereof. It is accordingly desired that the appended claims shall not be limited to any specific feature or details thereof.

We claim:
1. An apparatus for separating fiber and similar material from liquid dispersions of finely powdered material, comprising
   a rotor mounted for rotation on a vertical axis and having an upper wall with a central opening adapted to receive a liquid dispersion to be treated, and also having bottom and inner walls adapted to prevent passage of liquid therethrough,
   the upper and bottom walls of said rotor being spaced,
   a plurality of spaced vanes extending between the upper and bottom walls whereby said vanes are adapted to tangentially accelerate the liquid passing therebetween,
   the outer edges of said spaced vanes diverging upwardly at an angle of about 3° to 20° wtih respect to the vertical,
   a stationary tubular screen surrounding said rotor and having the shape of a frustoconical tube diverging upwardly at an angle of 3° to 20° from the vertical whereby liquid dispersion from the rotating rotor which strikes said stationary screen travels upwardly.
2. The apparatus as claimed in claim 1, comprising a casing surrounding said tubular screen,
   tank means positioned on said casing above the rotor,
   a first pipe means opening into the lower portion of said tank for feeding a liquid dispersion to be treated to said tank,
   a second pipe means extending from above the opening in the upper wall of said rotor into said tank means and having an opening in its upper part above the opening of said first pipe means.
3. The apparatus as claimed in claim 1, wherein said tubular screen extends above the level of the spaced vanes for a substantial distance,
   a helical vane conveyor on said rotor positioned above the upper wall thereof
   said helical vane following closely the contour of the upper part of said tubular screen having its uppermost part extending above said tubular screen whereby said helical vane conveys material retained by said screen to a region above said screen.
4. The apparatus as claimed in claim 3 comprising tubular means surrounding and holding said screen,
   said tubular means having a conduit connected to its lower surface to receive liquid passing through said screen,
   a casing surrounding said tubular means adapted to receive fiber distributed by said helical vane.

References Cited

UNITED STATES PATENTS

| | | | |
|---|---|---|---|
| 302,077 | 7/1884 | Wilson | 209—306 |
| 788,219 | 4/1905 | Ogle | 209—306 |
| 1,331,587 | 2/1920 | Shevlin | 209—273 |
| 1,663,731 | 3/1928 | Redlich | 127—56 |

OTHER REFERENCES

John H. Perry, "Chemical Engineers' Handbook," 19, p. 96, McGraw-Hill, New York, 1963.

George D. Dickey, "Filtration," p. 121, Reinhold Publishing Corp., New York, 1961.

MORRIS O. WOLK, *Primary Examiner.*

SILVEY MARANTZ, *Assistant Examiner.*

U.S. Cl. X.R.

127—23, 24, 67; 209—273, 306; 210—415